(12) United States Patent
Tokuhara et al.

(10) Patent No.: US 10,939,687 B2
(45) Date of Patent: Mar. 9, 2021

(54) METHOD FOR FORMING PIECES OF FOOD DOUGH AND AN APPARATUS THEREOF

(71) Applicant: RHEON AUTOMATIC MACHINERY CO., LTD., Utsunomiya (JP)

(72) Inventors: Yuzo Tokuhara, Utsunomiya (JP); Masaaki Tanoi, Utsunomiya (JP); Masaki Hosoya, Utsunomiya (JP); Kazuyoshi Onoguchi, Utsunomiya (JP)

(73) Assignee: RHEON AUTOMATIC MACHINERY CO., LTD., Utsunomiya (JP)

( * ) Notice: Subject to any disclaimer, the term of this patent is extended or adjusted under 35 U.S.C. 154(b) by 396 days.

(21) Appl. No.: 15/579,262

(22) PCT Filed: Jun. 1, 2016

(86) PCT No.: PCT/JP2016/066229
§ 371 (c)(1),
(2) Date: Dec. 4, 2017

(87) PCT Pub. No.: WO2016/199642
PCT Pub. Date: Dec. 15, 2016

(65) Prior Publication Data
US 2018/0153178 A1 Jun. 7, 2018

(30) Foreign Application Priority Data
Jun. 8, 2015 (JP) .............................. JP2015-115363

(51) Int. Cl.
*A21C 11/10* (2006.01)
*B26D 1/06* (2006.01)
(Continued)

(52) U.S. Cl.
CPC ................ *A21C 11/10* (2013.01); *B26D 1/06* (2013.01); *B26D 1/58* (2013.01); *B26D 7/08* (2013.01); *B26D 7/086* (2013.01)

(58) Field of Classification Search
CPC ........... A21C 11/10; B26D 1/06; B26D 7/086
See application file for complete search history.

(56) References Cited

U.S. PATENT DOCUMENTS

2010/0028516 A1* 2/2010 Vangeepuram .......... A21D 8/02
426/503

FOREIGN PATENT DOCUMENTS

| JP | 47-029318 B1 | 8/1972 |
| JP | 56-119393 A | 9/1981 |

(Continued)

OTHER PUBLICATIONS

International Search Report for PCT/JP2016/066229 dated Aug. 9, 2016 [PCT/ISA/210].

*Primary Examiner* — Ryan M Ochylski
(74) *Attorney, Agent, or Firm* — Sughrue Mion, PLLC

(57) ABSTRACT

A method for forming pieces of food dough and an apparatus thereof is able to cut the food dough continuously extruded through a nozzle along the shape of the hole of the nozzle without causing deformation, and to locate pieces of the food dough on a conveyor without causing deformation. The apparatus for forming pieces of food dough comprises an extruding device and a cutting device, wherein the extruding device comprises a nozzle to continuously extrude food dough downward, and the cutting device comprises a cutting blade to cut the food dough into the pieces of food dough, a moving mechanism to move the cutting blade forward from an initial position, then to move the cutting blade downward, and then to return the cutting blade to the initial position, and a carrying-out conveyor, which is disposed (Continued)

below the nozzle and moves in the direction that the cutting blade moves forward.

10 Claims, 6 Drawing Sheets

(51) Int. Cl.
    *B26D 7/08*     (2006.01)
    *B26D 1/58*     (2006.01)

(56) References Cited

FOREIGN PATENT DOCUMENTS

| | | |
|---|---|---|
| JP | 59-151829 A | 8/1984 |
| JP | 2013-179886 A | 9/2013 |

* cited by examiner

Fig. 4 An Example of a Cutting Defect Mode "(a) Displacement of Solid Materials"
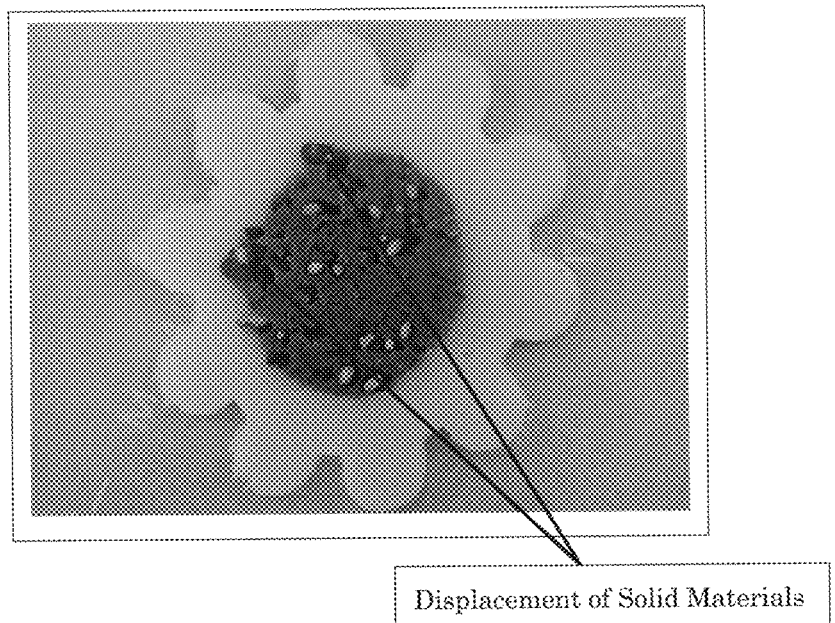
Fig. 5 An Example of a Cutting Defect Mode "(b) Cracked Solid Materials"
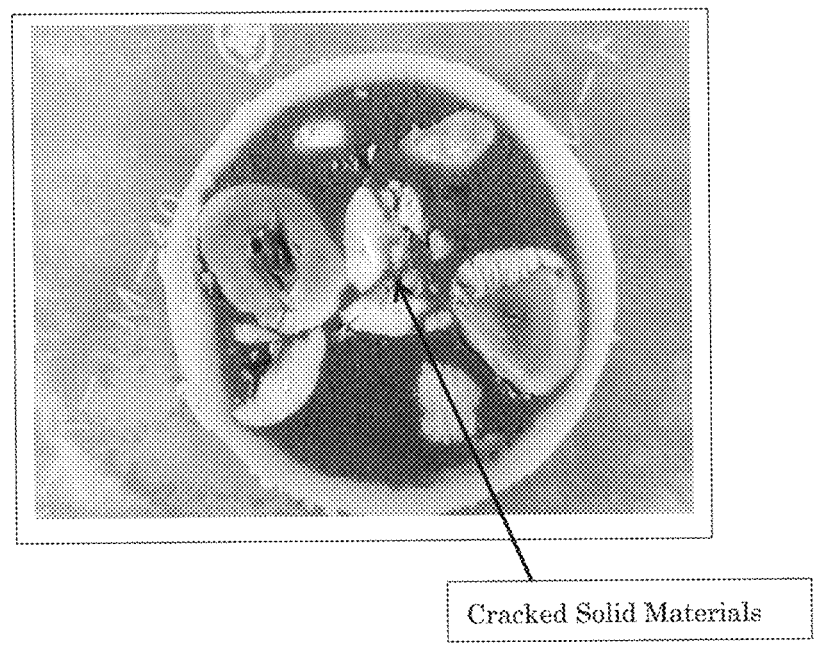

g. 6 (1-a) An Example of a Cutting Defect Mode
"(c) Deformation of a Shape of a Piece of Food Dough"
[An Example of Deformation of an Entire Shape]
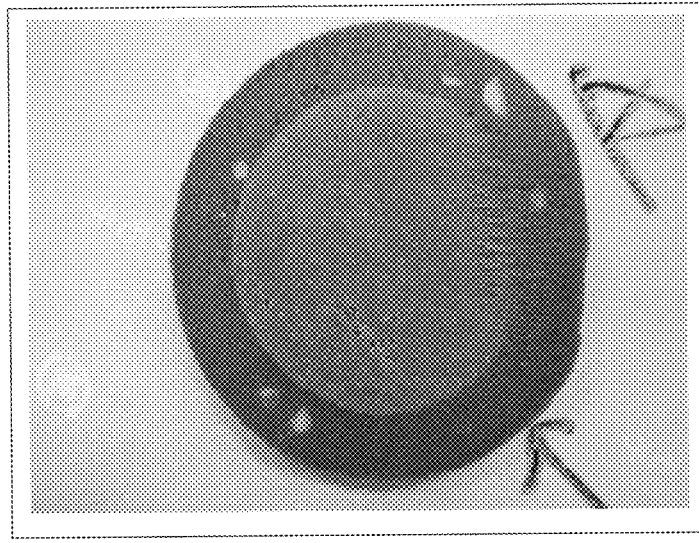
g. 6 (1-b) An Example of a Cutting Defect Mode
"(c) Deformation of a Shape of a Piece of Food Dough"
[An Example of a Normal Shape]
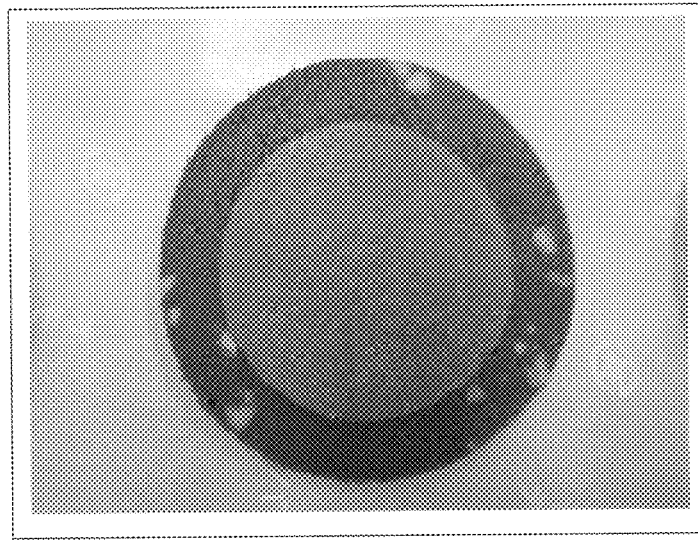

Fig. 6 (2-a)  An Example of a Cutting Defect Mode
"(c) Deformation of a Shape of a Piece of Food Dough"
[An Example of Deformation of an Entire Shape]
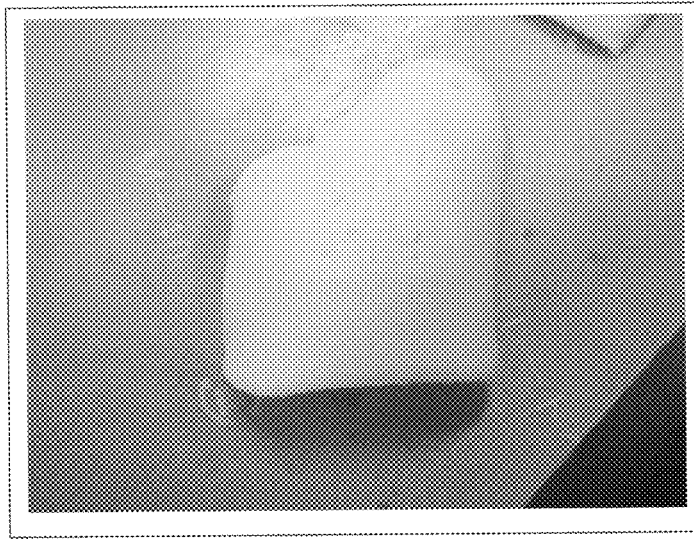
Fig. 6 (2-b)  An Example of a Cutting Defect Mode
"(c) Deformation of a Shape of a Piece of Food Dough"
[An Example of a Normal Shape]
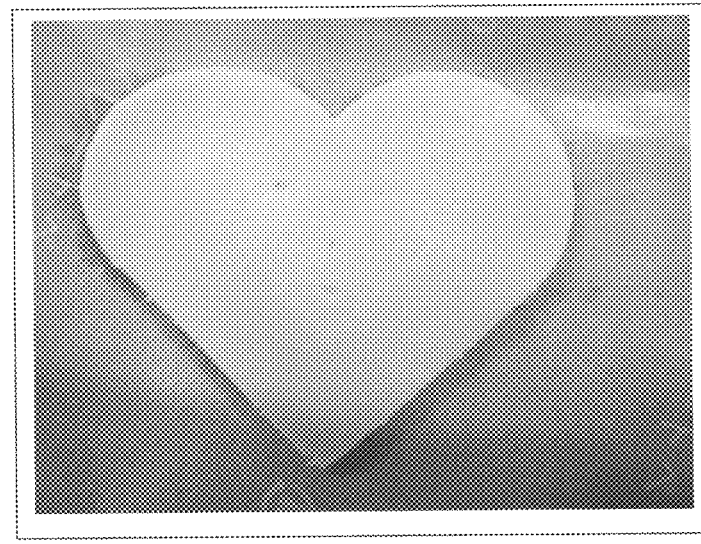

METHOD FOR FORMING PIECES OF FOOD DOUGH AND AN APPARATUS THEREOF

CROSS REFERENCE TO RELATED APPLICATIONS

This application is a National Stage of International Application No. PCT/JP2016/066229 filed Jun. 1, 2016, claiming priority based on Japanese Patent Application No. 2015-115363 filed Jun. 8, 2015, the contents of all of which are incorporated herein by reference in their entirety.

FIELD OF THE INVENTIONS

The inventions relate to a method for forming pieces of food dough and an apparatus thereof by cutting the food dough extruded through a nozzle. Particularly, they relate to the method for forming the pieces of food dough and the apparatus thereof that can steadily form the pieces of food dough without deforming them, when the pieces of food dough are cut out from the food dough extruded downward.

BACKGROUND OF THE INVENTIONS

Conventionally, in the field of manufacturing foods, such as cookies, fancy sweets having geometric configurations or forms of animal faces are manufactured by using a plurality of dough, materials or colors of which differ from each other, and an apparatus for extruding such food dough is proposed. An extruding mold disclosed in Patent Document 1 includes at least a first extruding mold to extrude a first food dough and a second extruding mold to extrude a second food dough, which is disposed at the outer side of the first extruding mold with a predetermined interval, and continuously extrudes the food dough for cookies having a form of an animal face at a horizontal cross section, from a hole for extruding the food dough.

Further, a cutting apparatus disclosed in Patent Document 2 uses an apparatus for encrusting a filling material, such as bean jam, and Patent Document 2 discloses an apparatus for cutting a food material continuously extruded through a nozzle into pieces of the food material having a thin disk-like shape. This cutting apparatus includes an extruding apparatus to continuously extrude the food material through the nozzle having a guide shaft at the center of a nozzle hole and a cutting device having a plurality of shutter members. The cutting device has a plurality of the shutter members, which can freely rotate. The cutting device introduces the food material to a cutting area created by the shutter members, and cuts the food material into the pieces of the food material having the disk-like shape by rotating each of the shutter members and closing the cutting area. Then, the shutter members move downward along the guide shaft, and put the pieces of the food material having the disk-like shape on a belt conveyor.

PRIOR ART

Patent Documents

Patent Document 1: Japanese Patent Laid-open Publication No. 119-75057

Patent Document 2: Japanese Patent Laid-open Publication No. 117-255356

SUMMARY OF THE INVENTIONS

Problems to be Solved by the Inventions

The cookie dough extruded from the extruding mold disclosed in Patent Document 1 is carried by a belt conveyor disposed under the extruding mold, and is cut into pieces of cookie dough by a cutting blade moving up and down. However, since the cookie dough continuously extruded is deformed at around an area contacting with the belt conveyor when the cookie dough is placed on the belt conveyor, there is a problem that the pieces of food dough cannot be formed into a shape corresponding to the shape of the hole for extruding the food dough of the extruding mold. Further, there is another problem that a deformation, such as a kink, is occurred when the food dough is cut into thin pieces.

In the cutting apparatus to cut the food material disclosed in Patent Document 2, since a hole is formed at the center of each of the pieces cut out from the food material due to the guide shaft, there is a problem that a quality of end products is degraded.

Further, Patent Document 2 discloses that an adherence between the shutter members and the food material is released by moving the shutter members to open the cutting area. However, when the food material is cut into thin pieces, the pieces cut out from the food material can be deformed due to the adherence between the food material and the shutter members moved to close the cutting area. Further, the thin pieces cut out from the food material are teared because of adhering to the shutter members moved to open the cutting area. Further, problems, such as scattering or deforming due to faulty dropping, such as meandering or inverting, are caused when the thin pieces cut out from the food material are dropped onto the conveyor.

The purpose of the inventions are to provide the method for forming the pieces of food dough and the apparatus thereof that can cut the food dough continuously extruded through the nozzle along the shape of the hole of the nozzle into the thin pieces without causing the problems explained above, and further that can stably locate the thin pieces on the conveyor without causing deformation.

Means of Solving the Problems

The inventions have been conceived to solve the problems explained above and is a method for forming pieces of food dough, comprising:

an extruding step to continuously extrude the food dough downward through a nozzle;

a cutting step to cut the food dough into the pieces of food dough along a radial direction of the extruded food dough by moving a cutting blade forward;

a dropping step to drop the pieces of food dough while the pieces are moving along the moving direction of the cutting blade; and a locating step to locate the pieces of food dough onto a carrying-out conveyor, which is disposed below the nozzle and moves in the direction that the cutting blade moves forward.

Further, the inventions include the feature, wherein ultrasonic vibration is applied to the cutting blade to cut the food dough, in the cutting step.

Further, the inventions include the feature, wherein an amplitude of the ultrasonic vibration of the cutting blade is ranged from 60 μm to 120 μm, in the cutting step.

Further, the inventions include the feature, wherein the cutting blade cuts the food dough with a distance less than 1 mm from the nozzle.

Further, the inventions include the feature, wherein an anti-adhesive agent is applied to the cutting blade to cut the food dough.

Further, the inventions include the feature, wherein the anti-adhesive agent is applied to the cutting blade after the cutting blade cuts the food dough multiple times.

The inventions also include an apparatus for forming pieces of food dough, comprising:

an extruding device and a cutting device, wherein
the extruding device comprises a nozzle to continuously extrude the food dough downward, and
the cutting device comprises a cutting blade to cut the food dough into the pieces of food dough;
a moving mechanism to move the cutting blade forward from an initial position, then to move the cutting blade downward, and then to return the cutting blade to the initial position; and
a carrying-out conveyor, which is disposed below the nozzle and moves in the direction that the cutting blade moves forward.

Further, the inventions include the feature, wherein the cutting blade is an ultrasonic-vibrating cutter.

Further, the inventions include the feature, wherein an amplitude of the ultrasonic-vibrating cutter is ranged from 60 μm to 120 μm.

Further, the inventions include the feature, wherein the cutting blade moves forward with a distance less than 1 mm from the nozzle.

The inventions include the feature, wherein the apparatus further comprises an applying device to apply an anti-adhesive agent to the cutting blade.

Further, the inventions include the feature, wherein the moving mechanism to move the cutting blade comprises a moving backward-and-forward mechanism, which is connected to a rotating shaft, to move the cutting blade backward and forward and a lifting-and-lowering mechanism, which is connected to the rotating shaft, to lift and lower the cutting blade.

The inventions include the feature, wherein apparatus further comprises a controlling system to be able to control the movement of the cutting blade by controlling an angular velocity of the rotating shaft.

The inventions include the feature, wherein the apparatus further comprises a controlling system to intermittently drive the cutting blade by repeating an intermittent rotation of the rotating shaft in a manner that the rotation of the rotating shaft is stopped during a predetermined time after the rotating shaft makes one rotation.

The inventions include the feature, wherein the apparatus further comprises a controlling system to drive the cutting blade in a manner that the time for moving the cutting blade forward differs from the time for moving the cutting blade backward by changing the angular velocity of the rotating shaft during the rotating shaft makes one rotation.

The inventions include the feature, wherein the apparatus further comprises:

a fixing mechanism to combine the extruding device and the cutting device;
a detecting device to detect that the extruding device and the cutting device are combined; and
a controlling system to be able to drive the extruding device and the cutting device when the detecting device transmits a detecting signal.

Effects of the Inventions

According to the inventions, the food dough continuously extruded through the nozzle can be cut into the pieces of food dough having the shape correspond to the shape of the hole of the nozzle without causing deformation. Further, the cut pieces of the food dough can be located on the conveyor without causing deformation. Thus, the conventional problems can be solved.

BRIEF DESCRIPTION OF THE DRAWINGS

FIG. 4 is a photograph showing an example of a cutting defect mode "(a) displacement of solid materials," in evaluation tests of cutting.

FIG. 5 is a photograph showing an example of a cutting defect mode "(b) cracked solid materials," in evaluation tests of cutting.

FIGS. 6(1-a), 6(1-b), 6(2-a) and 6(2-b) are photographs showing an example of a cutting defect mode "(c) deformation of a shape of a piece of food dough," in evaluation tests of cutting.

DETAILED DESCRIPTION OF THE EMBODIMENTS

Figure 1:
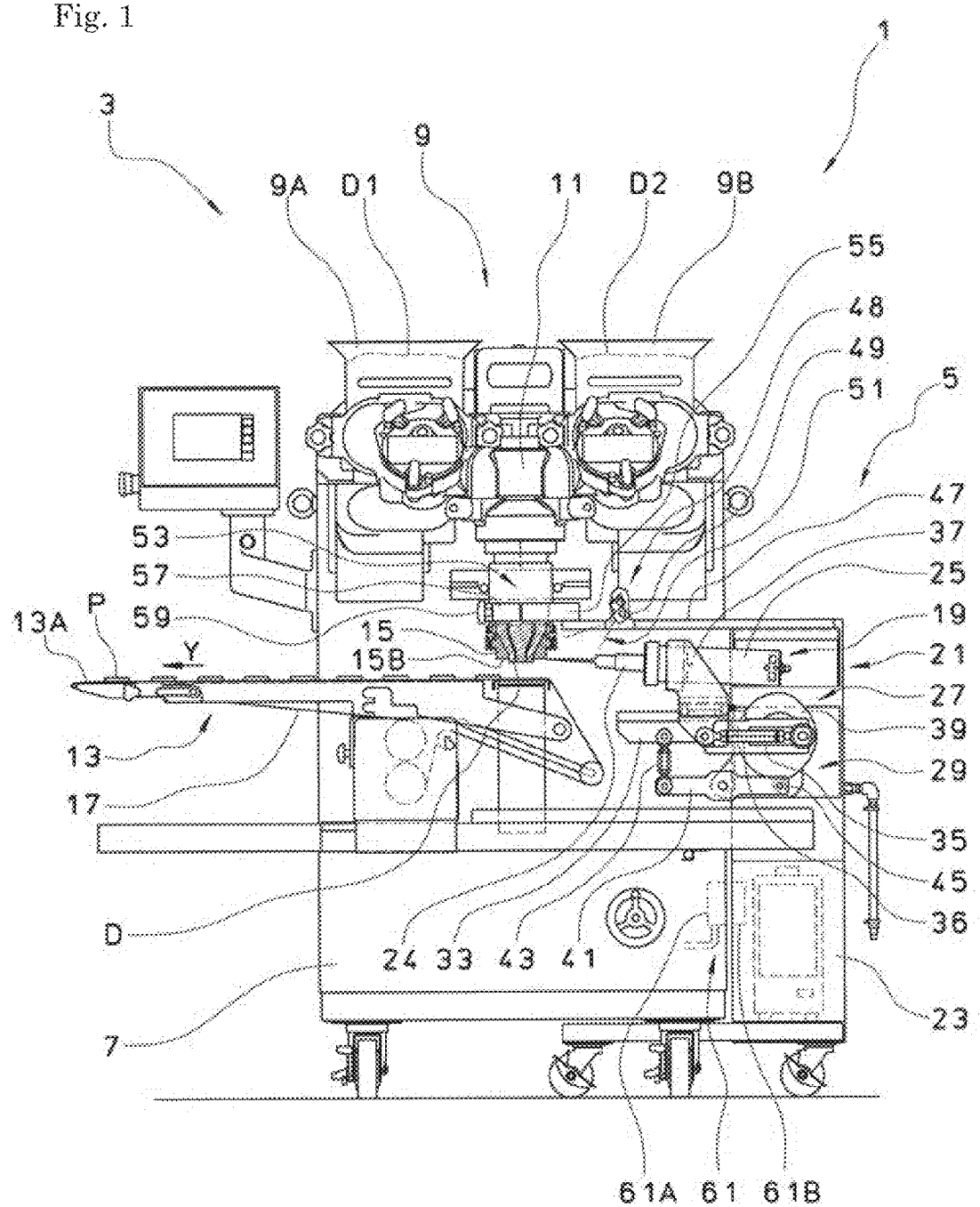
FIG. 1 shows an illustrative front view of an apparatus for forming pieces of food dough of an embodiment of the inventions.
Figure 2:
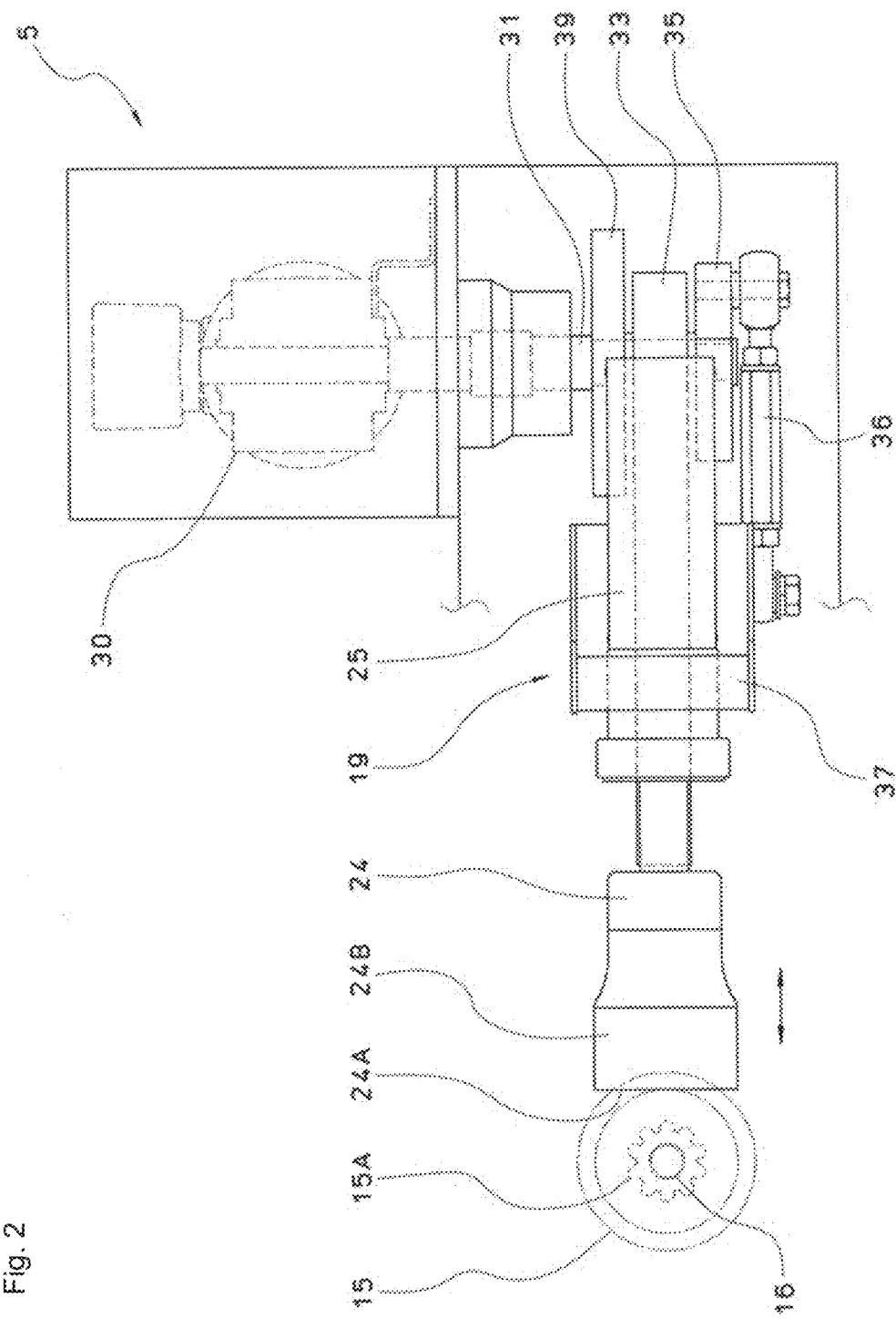
FIG. 2 shows an illustrative plan view of a main part of an apparatus for forming pieces of food dough of an embodiment of the inventions.

Below, an apparatus for forming pieces of food dough 1 is explained by referring to FIGS. 1-3. In this embodiment, the apparatus 1 that is used to cut food dough D consisting of first food dough D1 and second food dough D2 into thin pieces of food dough P is explained. The apparatus for forming the pieces of food dough 1 comprises an extruding device 3 to extrude the food dough D, a cutting device 5, and a controlling system 8 to control movements of each of those devices. The extruding device 3 comprises a base structure 7. A supplying device 9 to supply the first and the second food dough D1 and D2 is disposed at the upper surface of the base structure 7, a combining nozzle 11 is at the upper front surface of the base surface 7, and a carrying-out conveyor 13 is disposed at lower front surface of the base structure 7.

The supplying device 9 comprises a first supplying device 9A to supply the first food dough D1 and a second supplying device 9B to supply the second food dough D2. The combining nozzle 11 is connected to the first supplying device 9A and the second supplying device 9B, and continuously extrudes layered food dough D, wherein the first food dough D1 encrusts the outside of the second food dough D2.

An inner nozzle 16 for extruding the second food dough D2 and a nozzle 15 disposed around the inner nozzle 16 with a predetermined space are disposed at the lower part of the combining nozzle 11. The nozzle 15 extrudes the layered food dough D. A nozzle hole 15A of the nozzle 15 has concave and convex parts in a planar view at its outside surface.

The carrying-out conveyor 13 is a belt conveyor, which has an endless conveyor belt 17 and carries the pieces of food dough P in the moving direction Y by rotating the endless conveyor belt 17. The lower surface 15B of the nozzle 15 and the carrying surface 13A of the carrying-out conveyor 13 are disposed so as to be parallel to each other The cutting device 5 comprises an ultrasonic-vibrating cutter 19, a moving mechanism 21, and a base mounting 23. The ultrasonic-vibrating cutter 19 comprises a cutting blade 24 and a vibrator 25, which correspond to an ultrasonic-vibrating horn, as a unit. The moving mechanism 21 moves the ultrasonic-vibrating cutter 19, and is fixed to the base mounting 23.

The moving mechanism 21 comprises a moving backward-and-forward mechanism 27 to move the ultrasonic-vibrating cutter 19 backward and forward and a lifting-and-lowering mechanism 29 to lift and lower the ultrasonic-vibrating cutter 19. The moving backward-and-forward mechanism 27 and the lifting-and-lowering mechanism 29 are driven in synchronization by a driving motor 30. The moving backward-and-forward mechanism 27 comprises a rotating shaft 31, a guide rail 33, a crank arm 35, a joint 36, and a moving platform 37. The proximal end of the guide rail 33 is rotatably supported by the rotating shaft 31. The longitudinal axis of the guide rail 33 extends in the moving direction Y as viewed from above. The moving platform 37 is disposed at the guide rail 33 so as to be able to reciprocate. Further, the rotating shaft 31 comprises a crank mechanism, wherein the proximal end of the crank arm 35 is supported by the rotating shaft 31, and the other end of the crank arm 35 and the moving platform 37 are connected by means of the joint 36. Thus, the moving platform 37 reciprocates on the guide rail 33 by rotating the rotating shaft 31, and the ultrasonic-vibrating cutter 19 mounted to the moving platform 37 moves backward and forward.

The lifting-and-lowering mechanism 29 comprises the rotating shaft 31, a cam plate 39, a swinging arm 41, and a joint 43. The cam plate 39 is supported by the rotating shaft 31. A curved cam surface, a distance from which to the center of the rotating shaft 31 varies, is formed at the periphery of the cam plate 39. The center of the swinging arm 41 is rotatably supported by the base mounting 23, and a cam follower 45 is attached to one end of the swinging arm 41. The periphery of the cam follower 45 contacts with the periphery of the cam plate 39. Further, the other end of the swinging arm 41 and the guide rail 33 are connected each other by the joint 43. Thus, the guide rail 33 swings by rotating the rotating shaft 31 so that the proximal end of the guide rail 33 becomes a pivot point, and the ultrasonic-vibrating cutter 19 mounted to the moving platform 37 is lifted and lowered.

A well-known spraying device 49 as an applying device to apply an anti-adhesive agent 48 is disposed at an upper plate 47 of the base mounting 23. The spraying device 49 sprays an anti-adhesive agent 51, such as alcohol or water, toward the upper blade surface 24B of the cutting blade 24, which includes its blade edge 24A, during a predetermined time. The anti-adhesive agent 51 may be sprayed every time after the cutting blade 24 cuts the food dough D or any time after multiple cuttings. Since a liquid easy to vaporize, such as alcohol, has a high cooling effect for the cutting blade 24, it is effective to use such a liquid as the anti-adhesive agent 51, when the ultrasonic-vibrating cutter producing heat is used as the cutting blade 24.

A fixing mechanism 53 to combine and assemble the extruding device 3 and the cutting device 5 is disposed at a distal part of the upper plate 47 of the base mounting 23. The fixing mechanism 53 sandwiches the combining nozzle 11, has a plate 55 fixed to the upper plate 47 at one side and a fixing plate 57 at the other side, and is fixed to the combining nozzle 11 by a screw 59.

A detecting device 61 to detect that the extruding device 3 and the cutting device 5 are combined is disposed at the extruding device 3 and the cutting device 5. A well-known detecting device 61, such as a sensor type or a switch type, can be used. For example, in case of the detecting device of a magnet switch type, a magnet can be attached to the base mounting 23 of the cutting device 5, and a switch can be attached to the position within the base structure 7 of the extruding device 3, position of which corresponds to the magnet. When the cutting device 5 is combined with the extruding device 3, since the detecting device 61 transmits a detecting signal to the controlling system 8, and the detecting device 61 is in a sensing state, the controlling system 8 control the apparatus 1 (the extruding device 3 and the cutting device 5) to enable to be driven. Conversely, when the extruding device 3 and the cutting device 5 are separated from each other, since the detecting device 61 is not in a sensing state, the controlling system 8 can stop each device. Thus, it is beneficial in view of safety.

Figure 3A:
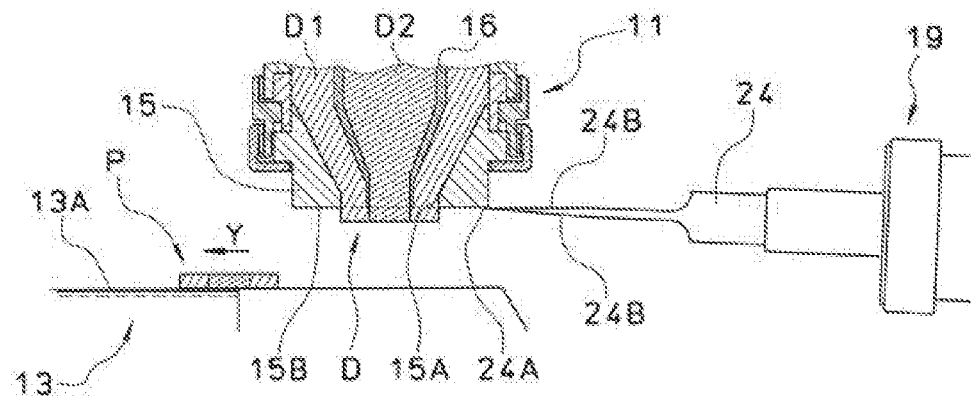
FIGS. 3(A)-3(D) are illustrative views showing operations of an apparatus for forming pieces of food dough of an embodiment of the inventions.
Figure 3B:
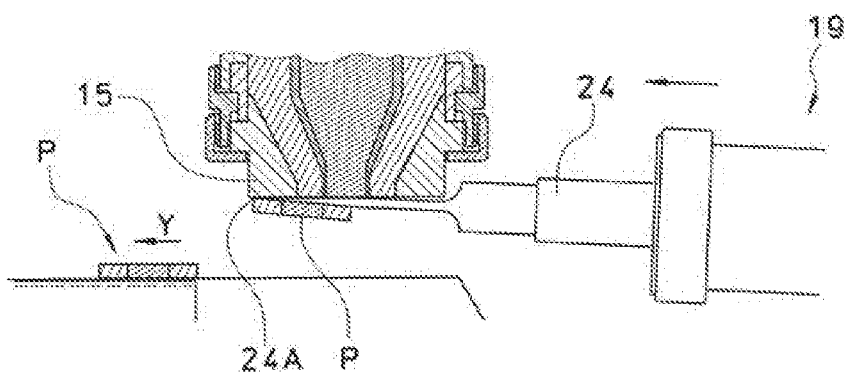
Figure 3C:
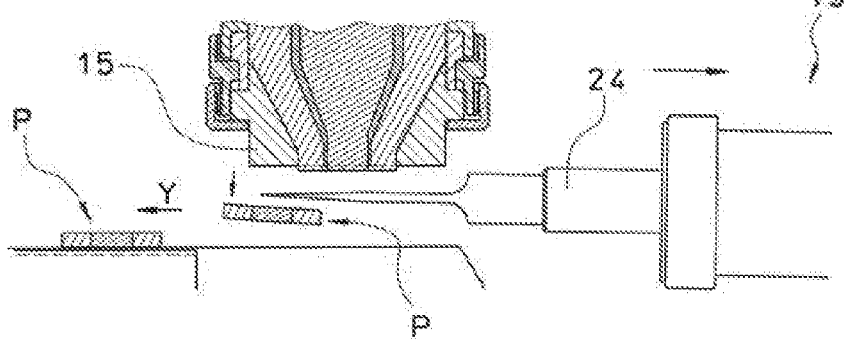
Figure 3D:
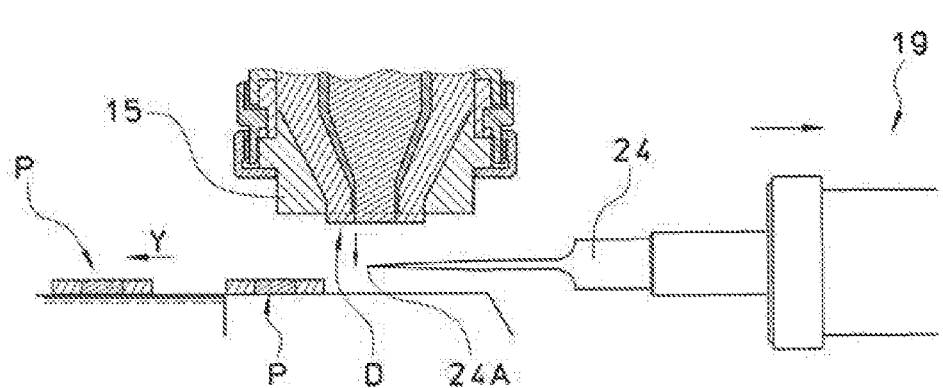

Next, processes for forming the pieces of food dough P by cutting the food dough D are explained. In the following explanation, the position of the cutting blade 24 shown in FIG. 3(A) is defined as an initial position. At the initial position, the blade edge 24A of the cutting blade 24 is located at the most lifted position and at upstream in the moving direction Y. The edge of the cutting blade 24 has a sharp angle, and the upper blade surface 24B and the lower blade surface 24C are disposed so that the upstream side of them is lower than the downstream side of them. While the cam plate 39 rotates 180 degrees from the initial position, the blade edge 24A is maintained at the most lifted position, and the ultrasonic-vibrating cutter 19 moves horizontally to the most downstream position (see FIG. 3(B)) along the moving direction Y.

The distance between the blade edge 24A and a lower surface 15B of the nozzle 15 is set less than 1 mm, and preferably, it is set at 0.3-0.5 mm. The blade edge 24A moves forward in the moving direction Y from the upstream to the downstream of the area that the food dough D comes down, and cuts the food dough D into the pieces of food dough P.

If the distance between the blade edge 24A and the lower surface 15B of the nozzle 15 is longer than 1 mm, since the food dough is pulled toward the outside of the nozzle 15, the food dough cannot be cut into the pieces having the shape corresponds to the shape of the hole of the nozzle. Further, if the distance between the blade edge 24A and the lower surface 15B of the nozzle 15 is too short, since the blade edge 24A and the lower surface 15B of the nozzle 15 may bump into each other, the blade edge 24A may be damaged. The pieces of food dough P fall while moving in the moving direction Y by thrust generated by the movement of the cutting blade 24, and are laid on the surface of the conveyor 13A, which is moving at a predetermined speed in the direction that the cutting blade 24 moves forward. Since the piece of food dough P is cut from the upstream side, the part cut first hangs down, and thus, it tends that the piece of food dough P is inclined, and the upstream part of the piece of food dough P gets lower than the downstream part of it. However, since the piece of food dough P receives the thrust in the horizontal direction, which is generated by the cutting blade 24 when the piece of food dough P is cut from the food dough D, the inclination of the piece of food dough P is corrected by a movement that the downstream part of the piece of food dough P pulls the upstream part of that, and further, the piece of food dough P is prevented from deforming, such as a flection. Further, since the piece of food dough P does not fall immediately below the nozzle hole 15A, as in the prior art, but falls while moving in the horizontal direction, the piece of food dough P is prevented from deforming when the piece of food dough P is laid on the surface of the conveyor 13A moving in the same direction as that of the movement of the piece.

While the cam plate 39 further rotates at 90 degrees (at 270 degrees from the initial point), the blade edge 24A reached to the most downstream position moves backward to the position below the nozzle 15 while descending to the most lower position (see FIGS. 3 (C) and (D)). The descending speed of the blade edge 24A is set at the speed faster than the speed that the food dough D is extruded from the nozzle hole 15A. While the cam plate 39 further rotates at 90 degrees (at 360 degrees from the initial point), the blade edge 24A moved to the most lower position ascends to the most upper position, moves to the upstream position, and returns to the initial position. When the cutting blade 24 returns to the initial position, it is configured that the cutting blade 24 does not contact with the food dough D. When the ultrasonic-vibrating cutter 19 returns to the initial position, the anti-adhesive agent 51 is sprayed from the spraying device 49 to the upper blade surface 24B of the cutting blade 24 during a predetermined time.

By repeating the series of the operations, the food dough D is continuously cut into the pieces of food dough P having the shape corresponding to the shape of the nozzle hole 15A, and a plurality of the pieces of food dough P are formed.

In this embodiment, the operations from when the cutting blade 24 moves from the initial position to when the cutting blade 24 returns to the initial position and is ready to start again are defined as one cycle. The cutting blade 24 moves according to the rotational angle of the rotating shaft 31 of the moving mechanism 21, and the moving speed of the cutting blade 24 is changed according to the angular velocity of the rotating shaft 31. When the number of the pieces of food dough P cut per unit time is set, the length of time required for one cycle is determined.

The rotating shaft 31 can be rotated continuously and at a constant angular velocity. Such operations of the cutting blade 24 are called as a "continuous operation." In this continuous operation, the angular velocity of the rotating shaft 31 is controlled so as to correspond to an increase or decrease of the number of the cut pieces of food dough P. Namely, if the number of the cut pieces of food dough P increases or decreases, the speed for moving the cutting blade 24 forward increases or decreases accordingly.

Further, the rotation of the rotating shaft 31 can be controlled in various modes corresponding to changes of physical properties, cutting thicknesses, etc., of the food dough D. For example, the rotating shaft 31 can be controlled so as to provide a time within the one cycle that the cutting blade 24 waits for starting its action at the initial position. In such a case, the operations of the cutting blade 24 are called as an "intermittent operation." In this intermittent operation, if the number of the cut pieces of food dough P is changed, the moving time of the cutting blade 24 can be fixed, and the speed of the cutting blade 24 moving forward can be maintained at a constant speed. For example, in the continuous operation, if the number of cutting is relatively reduced, the speed of the cutting blade 24 moving forward is decreased. Thus, the food dough D extruded from the nozzle 15 is stagnated by the cutting blade 24. To prevent the food dough D from stagnating, the cutting blade 24 is driven so as not to decrease the speed of the cutting blade 24 moving forward, and the movement of the cutting blade 24 can be controlled so as to provide a time within the one cycle that the cutting blade 24 does not move and waits for starting its action at the initial position.

Below, an example for controlling the cutting blade 24 in the intermittent operation by means of the controlling system 8 is explained.

The operation time of the cutting blade 24 is set at 1 second. In this setting, the number of cutting corresponds to 60 pieces of food dough P per minute in the continuous operation. In this intermittent operation, if the number of cutting is set at 30 pieces of food dough P, the waiting time of the cutting blade 24 becomes 1 second, since the one cycle time becomes 2 seconds.

Further, the rotating shaft 31 can be controlled so as to vary its angular velocity within the one cycle. In such a case, operations of the cutting blade 24 are called as a "variable operation." In this variable operation, if the number of cutting of the cut pieces of food dough P is changed, the moving speed of the cutting blade 24 can be maintained at a constant speed, and the cutting blade 24 can be returned to the initial position within the remaining time of the one cycle. For example, when the food dough D containing particulate materials is cut or the thin piece of food dough P is cut out, there is an optimum speed for cutting it. When the number of cutting is increased in the continuous operation, since the cutting speed is proportionally increased, the particulate materials cannot be cut, or a trouble that the thin piece of food dough P is damaged may be caused.

In this variable operation, the food dough D can be cut at the optimum cutting speed.

Below, an example for controlling the cutting blade 24 in the variable operation by means of the controlling system 8 is explained.

It is assumed that the optimum time of the cutting blade 24 moving forward to cut the food dough D is 1 second. In the variable operation, if the time of the cutting blade 24 moving forward is 1 second, the time of the cutting blade 24 moving backward becomes 1 second. Thus, the number of cutting becomes 30 pieces of food dough P per minute.

In this variable operation, if the number of cutting is set at 45 pieces of food dough P per minute, since the one cycle time becomes 1.5 seconds, the angular velocity of the rotating shaft 31 is controlled so as to be increased and so that the time of the cutting blade 24 moving backward becomes 0.5 second.

As explained above, by controlling the movement of the cutting blade 24, the pieces of food dough P can be stably formed without causing deformation.

The explanation of the apparatus for forming pieces of food dough 1 according to the embodiment of the inventions is mostly stated above.

However, the inventions are not limited to the above, and the inventions defined in the claims can be modified in various forms. For example, although it is explained that the food dough D has a solid and bar-like shape, the food dough D may have a hollow shape, and the pieces of food dough having a ring shape, such as a doughnut, can be formed. Further, although it is explained that the cutting device 5 comprises the ultrasonic-vibrating cutter 19, the cutting device 5 may comprise the cutter, to which periodic and tiny vibrations are applied or no vibration is applied. According to the physical properties of the food dough D to be cut, the proper cutter can be selected in view of economic efficiency.

Further, it is explained that the surface of the conveyor 13A of the carrying-out conveyor 13, where the pieces of food dough P are dropped and laid is horizontal. However, it is not limited to the above, and the surface of the conveyor 13A may be inclined so that it has an ascending slope toward the downstream from the upstream in the moving direction Y. As explained above, since the cut pieces of food dough P tend to be inclined to have a descending slope toward the upstream, the pieces of food dough P can be prevented from being deformed because the surface of the conveyor 13A has the slope corresponding to that of the pieces of food dough P.

Further, it is explained that the well-known spraying device 49 is used as the applying device to apply the anti-adhesive agent 48. However, it is not limited to spraying the anti-adhesive agent 51, and coating by using a brush, etc., can be used. In the above, it is explained that the anti-adhesive agent 51 is sprayed every time after the cutting blade 24 returns to the initial position, however, the frequency of spraying the anti-adhesive agent 51 can be appropriately set.

Next, in the method for forming pieces of food dough and the apparatus for forming pieces of food dough 1, results of evaluation tests for cutting the food dough D by using the ultrasonic-vibrating cutter 19 as the cutting blade 24 are explained.

Cookie dough, polvorone dough, and chocolate-cookie dough were used as the food dough D in the evaluation tests. Regarding each of the dough, five types of dough, that is, dough containing no solid material (particulate material), and dough containing solid materials (particulate materials), i.e., almond particles (a maximum size is 7 mm), sliced almonds (a maximum size is 15 mm), broken walnuts (a maximum size is 12 mm), and macadamia nut particles (a maximum size is 15 mm), were used in the evaluation tests. In this evaluation tests, multi-layered dough was used as the food dough D.

The ultrasonic-vibrating cutter 19 used in the evaluation tests cut the food dough D by the cutting blade 24, to which the 20 KHz ultrasonic vibration was applied in the direction that the food dough D is cut. An amplitude of the ultrasonic-vibrating cutter 19 was set as a parameter that is changing from 10 μm to 180 μm, in performing the evaluation tests for cutting the food dough D.

Further, the evaluation tests were performed under conditions that the distance between the cutting blade 24 and the nozzle 15 was 1 mm, the thickness of the cut food dough D was 8 mm, and the number of cutting per minute was 60.

In the evaluation tests for cutting the food dough D, the cutting ability was evaluated based on the manner defined below. As defect modes, three modes: (a) displacement of solid materials, (b) crack of solid materials, and (c) deformation of a shape of a piece of food dough (including turning-up a part of the piece and changing the shape of the piece) were considered, and a mild defect and a severe defect of the defect modes were determined.

The typical examples of the defect modes (a), (b), and (c) are shown in the photographs in FIGS. 4-6. All of these examples shown in FIGS. 4-6 correspond to the severe damaged defects.

The results of the evaluation tests are expressed by using marks, ⊙, ○, Δ, and X. Marks, ⊙, ○, Δ, and X are defined as follows.

⊙: No defect defined by the defect modes (a), (b), and (c) was occurred.

○: One mild defect of the defects defined by the defect modes (a), (b), or (c) was occurred.

Δ: Two mild defects of the defects defined by the defect modes (a), (b), and (c) were occurred.

X: One or more severe defects of the defects defined by the defect modes (a), (b), and (c) were occurred, or three mild defects of the defects defined by the defect modes (a), (b), and (c) were occurred. Or the case where the food dough D cannot be cut because of breakage or over heat of the ultrasonic-vibrating cutter 19 is also included.

Table 1 shows the results of the evaluation tests performed based on the conditions and the definitions explained above. From the results of the evaluation tests, it was proved that the amplitude of the ultrasonic-vibrating cutter 19 had a crucial impact in cutting the food dough D or the food dough D containing the solid materials (the particulate materials). Namely, by setting the amplitude of the ultrasonic-vibrating cutter 19 at 60 μm and more, if the various types of the solid materials (the particulate materials) were mixed to the various types of the food dough D, any defect, such as the displacement of the solid materials, the crack of the solid materials, or the deformation of the shape of the piece of food dough was occurred. Thus, the pieces of food dough P having a clean surface could be continuously cut, and significant effects were accomplished.

TABLE 1

Results of Evaluation Tests for Cutting the Food Dough

| Food Dough Provided for Evaluation Tests | | An Amplitude of an Ultrasonic-vibrating Cutter | | | | | | | | | | | |
|---|---|---|---|---|---|---|---|---|---|---|---|---|---|
| Types of Food Dough | Solid Materials | 10 μm | 20 μm | 30 μm | 40 μm | 50 μm | 60 μm | 80 μm | 100 μm | 120 μm | 140 μm | 160 μm | 180 μm |
| Cookie Dough | None | X | Δ | ○ | ⊙ | ⊙ | ⊙ | ⊙ | ⊙ | ⊙ | ⊙ | X | — |
| | Almond Particles (7 mm) | X | X | Δ | ○ | ⊙ | ⊙ | ⊙ | ⊙ | ⊙ | ⊙ | X | — |
| | Sliced Almonds (15 mm) | X | Δ | ○ | ○ | ⊙ | ⊙ | ⊙ | ⊙ | ⊙ | ⊙ | X | — |
| | Broken Walnuts (12 mm) | X | X | Δ | ○ | ○ | ⊙ | ⊙ | ⊙ | ⊙ | ⊙ | X | — |
| | Macadamia Nut Particles (15 mm) | X | Δ | ○ | ○ | ⊙ | ⊙ | ⊙ | ⊙ | ⊙ | ⊙ | X | — |
| Polvorone Dough | None | X | Δ | ○ | ⊙ | ⊙ | ⊙ | ⊙ | ⊙ | ⊙ | ⊙ | X | — |
| | Almond Particles (7 mm) | X | X | ○ | ○ | ⊙ | ⊙ | ⊙ | ⊙ | ⊙ | ⊙ | X | — |
| | Sliced Almonds (15 mm) | X | Δ | ○ | ⊙ | ⊙ | ⊙ | ⊙ | ⊙ | ⊙ | ⊙ | X | — |
| | Broken Walnuts (12 mm) | X | X | Δ | Δ | ○ | ⊙ | ⊙ | ⊙ | ⊙ | ⊙ | X | — |
| | Macadamia Nut Particles (15 mm) | X | X | Δ | ○ | ○ | ⊙ | ⊙ | ⊙ | ⊙ | ⊙ | X | — |
| Chocolate-Cookie Dough | None | X | X | Δ | ○ | ⊙ | ⊙ | ⊙ | ⊙ | ⊙ | ⊙ | X | — |
| | Almond Particles (7 mm) | X | X | Δ | Δ | ○ | ⊙ | ⊙ | ⊙ | ⊙ | ⊙ | X | — |
| | Sliced Almonds (15 mm) | X | X | X | Δ | ○ | ⊙ | ⊙ | ⊙ | ⊙ | ⊙ | X | — |
| | Broken Walnuts (12 mm) | X | X | X | Δ | ○ | ⊙ | ⊙ | ⊙ | ⊙ | ⊙ | X | — |
| | Macadamia Nut Particles (15 mm) | X | X | X | Δ | ○ | ⊙ | ⊙ | ⊙ | ⊙ | ⊙ | X | — |

Further, it is proved that if the amplitude of the ultrasonic-vibrating cutter 19 was set at 160 μm, the ultrasonic-vibrating cutter 19 was broken, or was unable to conduct continuous cutting by overheating, and because of those functional problems, the ultrasonic-vibrating cutter 19 could not continuously cut the food dough D.

Thus, the evaluation test wherein the amplitude of the ultrasonic-vibrating cutter 19 was set at 180 μm was not performed.

In the above, it is explained that the ultrasonic-vibrating cutter 19 cuts the food dough D by the cutting blade 24 to which the 20 KHz ultrasonic vibration was applied in the direction that the food dough D is cut; however, it is not limited to this configuration. For example, the direction to add the 20 KHz ultrasonic vibration may be set at the direction rotated at 90 degrees or 45 degrees from the direction for cutting the food dough D by the cutting blade 24. Further, the frequency of the ultrasonic vibration may be set at more than or less than, 20 KHz.

Further, in the above, it is explained that the cutting blade 24 cuts the food dough D by the combination of the backward-and-forward motion of the moving backward-and-forward mechanism and the lifting-and-lowering motion of the lifting-and-lowering mechanism. However, it is not limited to this configuration. For example, the cutting blade 24 may be attached to a revolving shaft disposed at the side of the nozzle 15 to revolve the cutting blade 24, and the food dough D may be cut only by revolving motions of the cutting blade 24.

Further, in the above explanation, the timing for adding ultrasonic vibration to the ultrasonic-vibrating cutter 19 is not explained. However, while operating the apparatus for forming pieces of food dough 1, the ultrasonic vibration may be constantly applied to the ultrasonic-vibrating cutter 19. Or the ultrasonic vibration may be applied to the ultrasonic-vibrating cutter 19 only while the ultrasonic-vibrating cutter 19 is moving forward or the ultrasonic-vibrating cutter 19 is cutting the food dough D. By intermittently adding the ultrasonic vibration to the ultrasonic-vibrating cutter 19, the heat produced by the ultrasonic-vibrating cutter 19 can be reduced, and the apparatus for forming pieces of food dough 1 can be operated for a long time.

EXPLANATIONS OF DENOTATIONS 1 an apparatus for forming pieces of food dough
3 an extruding device
5 a cutting device
7 a base structure
13 a carrying-out conveyor
19 an ultrasonic-vibrating cutter
21 a moving mechanism
23 a base mounting
24 a cutting blade
27 a moving backward-and-forward mechanism
29 a lifting-and-lowering mechanism
48 an applying device to apply an anti-adhesive agent
53 a fixing mechanism
61 a detecting device
D food dough
P pieces of food dough
Y a moving direction

What we claim is:

1. An apparatus for forming pieces of food dough, comprising:
an extruding device and a cutting device, wherein
the extruding device comprises a nozzle to continuously extrude food dough downward, and
the cutting device comprises a cutting blade to cut the food dough into the pieces of food dough;
a moving mechanism to move the cutting blade forward from an initial position, then to move the cutting blade downward, and then to return the cutting blade to the initial position; and
a carrying-out conveyor, which is disposed below the nozzle and moves in the direction that the cutting blade moves forward,
wherein the moving mechanism to move the cutting blade comprises:
a moving backward-and-forward mechanism to move the cutting blade backward and forward, and
a lifting-and-lowering mechanism to lift and lower the cutting blade, and
wherein the moving backward-and-forward mechanism comprises:
a crank mechanism connected to a rotating shaft,
a moving platform connected to the crank mechanism to mount the cutting blade, and
a guide rail, on which the moving platform is disposed so as to reciprocate.

2. The apparatus for forming the pieces of food dough according to claim 1,
wherein the cutting blade is an ultrasonic-vibrating cutter.

3. The apparatus for forming the pieces of food dough according to claim 1,
wherein an amplitude of the ultrasonic-vibrating cutter is ranged from 60 μm to 120 μm.

4. The apparatus for forming the pieces of food dough according to claim 1,
wherein the cutting blade moves forward with a distance less than 1 mm from the nozzle.

5. The apparatus for forming the pieces of food dough according to claim 1,
wherein the apparatus further comprises an applying device to apply an anti-adhesive agent to the cutting blade.

6. The apparatus for forming the pieces of food dough according to claim 1,
wherein the apparatus further comprises a controlling system to be able to control the movement of the cutting blade by controlling an angular velocity of the rotating shaft.

7. The apparatus for forming the pieces of food dough according to claim 1,
wherein the lifting-and-lowering mechanism comprises:
a cam plate supported by the rotating shaft, and
a swinging arm to swing the guide rail so that the proximal end of the guide rail becomes a pivot point,
wherein a cam follower is attached to one end of the swinging arm and contacts with a curved cam surface at the periphery of the cam plate, and
wherein the guide rail is connected to the other end of the swinging arm.

8. The apparatus for forming the pieces of food dough according to claim 1,
wherein the apparatus further comprises a controlling system to intermittently drive the cutting blade by repeating an intermittent rotation of the rotating shaft in a manner that the rotation of the rotating shaft is stopped during a predetermined time after the rotating shaft makes one rotation.

9. The apparatus for forming the pieces of food dough according to claim 7, wherein the apparatus further comprises a controlling system to drive the cutting blade in a manner that the time for moving the cutting blade forward differs from the time for moving the cutting blade backward by changing the angular velocity of the rotating shaft during the rotating shaft makes one rotation.

10. The apparatus for forming the pieces of food dough according to claim 1, further comprising:
a fixing mechanism to combine the extruding device and the cutting device;
a detecting device to detect that the extruding device and the cutting device are combined; and
a controlling system to be able to drive the extruding device and the cutting device when the detecting device transmits a detecting signal.

* * * * *